United States Patent [19]

Lane, Jr. et al.

[11] Patent Number: 4,768,330
[45] Date of Patent: Sep. 6, 1988

[54] BAG GRIPPER AND SPREADER FOR FORM, FILL AND SEAL BAGGING MACHINE

[75] Inventors: William A. Lane, Jr., Lake Arrowhead; Steven D. Davis, Yuciapa, both of Calif.

[73] Assignee: W. A. Lane, Inc., San Bernardino, Calif.

[21] Appl. No.: 79,458

[22] Filed: Jul. 30, 1987

[51] Int. Cl.⁴ ............................................. B65B 9/02
[52] U.S. Cl. ........................................ 53/554; 53/373
[58] Field of Search ................. 53/373, 450, 451, 548, 53/551, 552, 554

[56] References Cited

U.S. PATENT DOCUMENTS

| | | | |
|---|---|---|---|
| 2,732,988 | 1/1956 | Feinstein | 53/373 X |
| 2,751,732 | 6/1956 | Woppman | 53/554 |
| 4,107,900 | 8/1978 | Izumi | 53/548 X |
| 4,534,159 | 8/1985 | Kelly | 53/373 X |
| 4,583,352 | 4/1986 | Heron | 53/373 X |
| 4,631,901 | 12/1986 | Chung et al. | 53/373 X |

Primary Examiner—James F. Coan
Assistant Examiner—Steven P. Weihrouch
Attorney, Agent, or Firm—Herb Boswell

[57] ABSTRACT

For use on a form, fill and seal bagging machine a left side bag gripping member and a right side bag gripping member are located in association with a movable component of the bagging machine as, for instance, the head seal. The bag grippers contact and grip the left and right respective sides of a bag and spread these sides apart from one another just prior to formation of a cross seal on the bag by the head seal. This insures that the heat sealable film utilized on the machines is not puckered or pinched by the head seal therefore leading to a defective seal between the front and rear films forming the bag.

6 Claims, 3 Drawing Sheets

BAG GRIPPER AND SPREADER FOR FORM, FILL AND SEAL BAGGING MACHINE

BACKGROUND OF INVENTION

This invention is directed to a bag gripper for use in conjunction with a form, fill and seal bagging machine. The bag gripper assists during the sealing of a bag which is formed, filled, and sealed on this type of machine.

In the packaging industry the word "seal" is used for both hardware which forms "seals" or joints and also for the "seal" or joint itself. Thus, side seals (hardware) form side seals (joints) between films. In using the words "seal" or "seals" in this specification, if its meaning is not clear from the context of the sentence it is used in, it will be more fully identified by modifiers or synonyms.

Thus, for certain specific hardware, the word "bar" will be used to indicate that it is the hardware element which is being identified. Unless otherwise indicated or modified, the word "seal" by itself will generally refer to the joint which is formed. "Side seal", "top seal", "bottom seal" and "cross seal" or "transverse seal" unless other wise indicated or modified will refer to joints between the film whereas "head seal" will always refer to specific hardware to form the cross or transverse seal.

With the advent and growth of certain industries, most particularly the fast food industry, machines have been developed which continuously form, fill and seal bags or pouches. These machines utilize continuous rolls of heat sealable film which are heat sealed together to form bags or pouches. Typically side seals (side joints) are continuously made between the front and back film, a bottom seal (bottom joint) is made, the bag or pouch filled and the bag or pouch completed by forming a top seal (top joint).

Most of the form, fill and seal bagging machines presently utilized, are utilized for convenience foods and/or packaging of food condiments. Typically a gang of side seals, i.e. the hardware that forms the side seals, will be lined up in parallel across the width of the continuous front and back films. These form individual parallel side seals or side joints which are spaced apart from each other at varying widths of from approximately 1½ inches, which would be utilized for condiment packaging, upwards to approximately 12 inches, which would be utilized for food or other type items. Typically the rolls of film utilized for the front and back surfaces will be approximately 12 to 24 inches in width and as such simultaneously anywhere from several to approximately a dozen or so bags or pouches can be concurrently formed, filled and sealed by the machine.

As the continuous front and back films move through the machine, at least two or more side seals (joints) are formed between these films. This forms the side edges of parallel bags. These side seals (joints) are then cut or severed to separate the individual parallel bags. A cross or transverse seal (joint) is then made across the width of the film. This seal is normally made much wider than the side seals and is split such that concurrently a top seal will be made for the bottom most of two adjoining or adjacent pouches and a bottom seal will be made for the top most of the two adjoining or adjacent pouches. When the bottom seal of a pouch, whether it is a single pouch or a gang of side by side pouches, is formed the pouch is then filled with product utilizing filling tubes, filling heads or the like and then the pouch with the product inside of it is completed by forming the cross seal which seals the top of a filled bag and creates the bottom seal for the next empty bag which will be filled.

The cross or transverse seal is generally made utilizing a sealing hardware component called a head seal. This forms a seal (joint) which is wide enough to serve as both a top seal for one package and a bottom seal for another package. This head seal can include a cut off knife fixed to it or independent cut off mechanism can be located below the head seal to sever the cross seal to form individual top seals and bottom seals on the adjacent bags or pouches.

The head seal as well as the side seals (hardware) are generally formed of metallic elements, i.e. sealing bars, which include resistance heaters therein which heat the metallic bars. A back and a front heated sealing bar are brought together squeezing the film between them to heat seal the front film and the back film together forming an impervious seal between the two films. Advancement of the film, operation of the side seals (hardware) and the head seal is all capable of being controlled by microprocessors and the like such that the form, fill and seal bagging machines are capable of essentially continuous operation. Operator attention is only necessary for loading the rolls of continuous heat sealing film and loading the supply of the component product which is being sealed in the bags or pouches.

In forming, filling and sealing small bags or pouches such as condiment pouches or small food or other product pouches or bags, the amount of the component which is added to the partly formed empty bag or pouch is generally small compared to the flex strength of the film being utilized to form the bag or pouch. Additionally, the distance between the respective left and right side seals of each individual pouch or bag is also small. In view of this after filling but before the top seal is formed these pouches or bags are fairly stable and do not tend to balloon out to an significant extent under the weight of the contents. Unless there are wrinkles from other sources, the head seal then smoothly joins the front film and the back film together to form a smooth and continuous cross seal.

However the size of the bags or pouches and the materials which could be located therein has generally been limited by the inability to control ballooning of larger bags after they are filled but prior to forming the cross seal to seal the top of the bag or pouch. This generally limited what materails and what volume and weight of these materials could be appropriately packaged utilizing this packaging technique. Once sizes of approximately one quarter pound of liquid volume are encountered, the weight of the liquid in the filled but not as yet top sealed bag tends to balloon out the front and back film surfaces separating these surfaces from one another. As a result, the bag is distorted and assumes somewhat of a tear drop shape as it is suspended on the form, fill and seal bagging machine. When so shaped it is potentially possible when the front and back sufaces are contacted by the head seals and brought together that a wrinkle or a crimp can develop in one of the front or back films. This can then form an incomplete seal within the cross seal between two adjacent bags and when the bags are separated, one or both will leak.

Because of the tendency of larger bags or bags filled with heavy liquids to bulge, balloon or otherwise distort in between the filling step and formation of the cross seal, heretofore this has limited form, fill and seal bagging machines as to the size of bags or pouches which could be formed or the material which could be packaged therein.

BRIEF DESCRIPTION OF THE INVENTION

In view of the above it is a broad object of this invention to provide for a bag gripper for use with a form, fill and seal bagging machine which assists in the formation of bags or pouches on these machines. It is a further object to provide for mechanisms and processes to be utilized with form, fill and seal bagging machines which allow for the formation of bags or pouches which are capable of holding larger volumes of material or certain materials which hertofore have not been available with present form, fill and seal bagging machines.

These and other objects as will be become evident from the remainder of this specification are achieved in a bag gripper for a form, fill and seal bagging machine which includes a left side bag engaging means for engaging the left side of a bag being formed, filled and sealed on the machine. The left side bag engaging means is located on the bagging machine is operative association with the left side of a bag or pouch. The bag gripper further includes a right side bag engaging means for engaging the right side of a bag being formed, filled and sealed on the bagging machine. The right side bag engaging means is located on the bagging machine in operative association with the right side of a bag or pouch. Further, the bag gripper includes movement means for moving at least a portion of one of the left or right side bag engagement means in a direction away from the other of the bag engagement means. The movement of the portion of at least one of the bag engagement means is transferred to the respective side of the bag to move that side of the bag outwardly with respect to the other side of the bag. This pulls the side edges of the bag away from each other in the area where the cross seal will be formed to bias the front and back films of the bag toward one another.

Typically the movement means would be capable of moving portions of both the left and right side bag engagement means in opposite directions along an elongated pathway away from one another to concurrently move both the left and right sides of the bag in a direction away from each other.

In the illustrative embodiment, the left and right side bag engagement means are located on the head seal to move in conjunction with the head seal. In this illustrative embodiment each of the left and right side engagement means includes a translocation means which is capable of contacting and gripping an edge of the bag and relocating it in a direction away from the opposite edge of the bag so as to pull or extend the edges of the bag away from one another. This translocation means can be located on a base member which attaches to a moving component of the bagging machine, as for instance, the head seal. A redirection means can be associated with the translocation means to move the translocation means along a vector which is set at an angle to the direction of movement of the base means.

In an improved process of the invention for forming a bag or pouch on a form, fill and seal machine, continuous film rolls of heat sealable film are loaded on the machine to form a front continuous film and a back continuous film. The front and back continuous films are moved past side seal bars to form at least first and second continuous side seals between the front and back films. A first bottom seal is then formed and extends between the first and second side seals to define an elongated empty three sided pouch. An aliquot of a suitable product is then added to this pouch. The aliquot of product is contained in the interior of the pouch between the front and back films defined between the side seals and above the bottom seal. The first and second side seals of the filled pouch are then gripped at points in association with the top level of the product within the bag and spread apart from one another to bias the front and back films toward one another along a line which is associated with the top level of the product and extends between the first and second seals and is spaced upwardly from the bottom seal. The front and back films are then contacted with a head seal to form a continuous cross seal between the first and second seals with the bottom part of the cross seal forming the top seal on a lower filled pouch and the top part of the cross seal forming the bottom seal on a further empty pouch.

This process can be augmented by continuously advancing the front and back films past the side seal bars which form continuous side seals and continuously repeating in sequence the filling, gripping and contacting steps. Further if it is desirous to separate the individual bags or pouches from one another the cross seal can be cut between the top seal of the lower filled pouch and the bottom seal of the further empty pouch to separate the lower filled pouch from the further empty pouch.

BRIEF DESCRIPTION OF THE DRAWINGS

This invention will be better understood when taken in conjunction with the drawings wherein.

This invention utilizes certain principles and/or concepts which are set forth in the claims appended hereto. Those skilled in the packaging and machine arts will realize these principles and/or concepts are capable of being utilized in a variety of embodiments which may differ from the exact embodiment utilized for illustrative purposes. For this reason this invention is not to be construed as being limited solely to the illustrative embodiment but should only be construed in view of the claims.

DETAILED DESCRIPTION OF THE INVENTION

Figure 1:
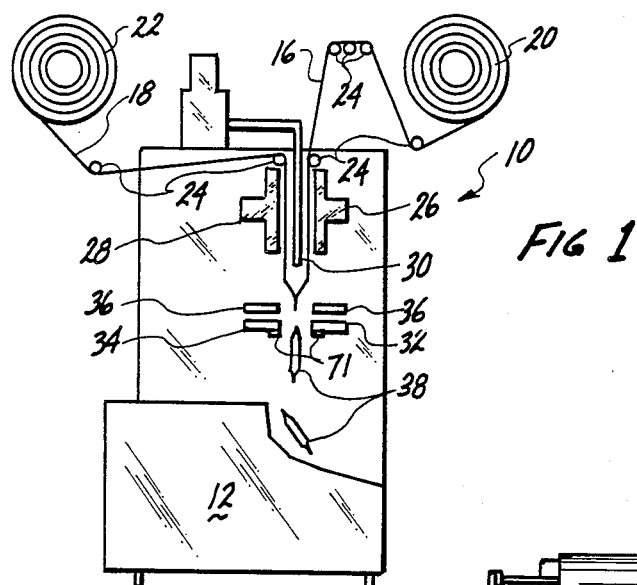
FIG. 1 is a side elevational view of a representational form, fill and seal bagging machine.
Figure 2:
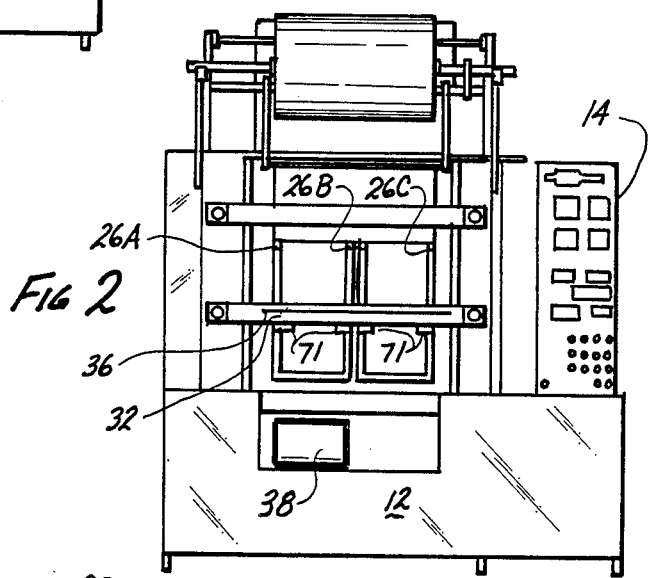
FIG. 2 is a front elevational view of the representational machine of FIG. 1.

In FIGS. 1 and 2 a typical, commercial form, fill and seal bagging or pouching machine is illustrated in a schematic abbreviated manner. Insofar as these machines are commercially available only certain major components which are necessary to the understanding of this invention will be discussed. As will be evident from the remainder of this specification, the bag grippers of this invention are capable of being utilized with a variety of different commercial form, fill and seal bagging machines which may have slightly different layouts. Typically, however, all of these machines include certain basic components.

The machine 10 has a housing 12. As seen in FIG. 2 on the right side of the housing 12 is a control unit 14. These represent typical commercially available machines, as for instance, a L12, a L18 or a L25 Form, Fill and Seal Bag and Pouch Machines available from Lane Manufacturing, 998 South Sierra Way, San Bernardino, Calif. 92408. These machines utilize a variety of microprocessors within the control unit 14 to control the functions of the machine 10. Typically these machines are set up to run for a full shift, i.e. 8 hours, with only minimal operator attention.

The machine 10 utilizes a front heat sealing film 16 and a rear heat sealing film 18 which are loaded into the machine 10 as continuous rolls 20 and 22. Typically the films 16 and 18 would be films which are about 24 inch wide and the rolls 20 and 22 would be of a sufficient length so as to form a roll of approximately 28 inches diameter which would serve to supply the machine 10 for the totality of a typical 8 hour shift of run time. In any event the films 16 and 18 are threaded through appropriate supply rollers collectively identified by the numeral 24 such that they become positioned next to and overlaying one another.

The front film 16 and the rear film 18 are fed between front and rear side seal bars 26 and 28 (heat sealing hardware units). These form continuous seals or joints between the front and rear film 16 and 18. As shown in FIG. 2 the machine 10 utilizes 3 front side seal bars 26A, 26B and 26C. Three corresponding rear side seal bars 28 would be located directly behind the front side seal bars 26. Thus as used, the machine 10 produces two side by side or parallel pouches or bags. A left bag would be formed by side seal bars 26A and 26B and a right bag formed between side seal bars 26B and 26. Thus, if 24 inch wide film 16 and 18 is utilized, each of the left and right bags would be approximately 12 inches across in width.

As the films 16 and 18 feed through the side seal bars 26 and 28, continuous parallel side seals are formed between the front and rear films 16 and 18. If a dual bag machine, such as that seen in FIG. 2 is being utilized, an appropriate cutter, not separately shown or numbered would be located in association with the front side seal bar 26B and the corresponding rear side seal bar 28 located behind it so as to sever the continuous film continuously in the middle of this side seal to create separate left and right bags or pouches. The formation of the side seals and severing and cutting of them is as is standard in the commercial form, fill and seal bagging machines noted above.

As the films 16 and 18 pass the side seal bars 26 and 28 and are joined together they form continuous "tubes" by virtue of their parallel side seals. Located in the center of these "tubes" are appropriate filling heads shown in representational form in FIGS. 1 through 4 and collectively identified by the numeral 30 in all of the figures. The filling heads could be of a variety of sizes and configurations depending upon what material was being loaded in the bags or pouches being made on the machine 10. These filling heads can vary from simple tubes which simply inject material, to more sophisticated filling heads which are utilized in conjunction with materials having particulate matter therein. In any event, the filling heads 30 are positioned or located between the front film 16 and the back film 18 downstream from the side seal bars 26 and 28.

Located below or downstream from the filling heads 30 is the head seal which is made up of front and rear head seal bars 32 and 34 respectively. Together the front and rear head seal bars 32 and 34 form a cross seal which extends between the side seals joining the front and rear film 16 and 18. This cross seal concurrently forms the top seal of a lower of two adjacent bags and the bottom seal of the upper of two adjacent bags as the films 16 and 18 advance through the bagging machine 10.

After filling of the partially formed bag or pouch with an aliquot of product, the filled bag or pouch and its contents are located below the level of head seal bars 32 and 34. The head seal bars 32 and 34 are now brought together to form the cross seal which then seals the materials within the pouch forming the top seal or top joint on the filled pouch and, as noted, concurrently also forms the bottom seal or bottom joint on the next adjacent pouch located upstream and now positioned to receive product from the filling head 30.

Typically the head seal is mechanically or hydraulically operated with the head seal bars 32 and 34 moving in and out toward and away from one another during each bag cycle to come together squeezing the front and rear films 16 and 18 between them and heat sealing the films together to form the cross seal or transverse seal. The head seal bars 32 and 34 them move back from one another. Thus the front head seal 32 is moved toward the rear head seal 34 concurrently while the rear head seal 34 moves toward the front head seal 32 until they meet and squeeze the film between each other.

On the above noted commercial machines, a cutting mechanism (not shown) normally is located below the front and rear head seal bars 32 and 34 to sever a bottom bag or pouch from the next top bag or pouch of two adjacent pouches which are connected by the cross seal. As with the head seal bars, this cutting mechanism can be either mechanically or hydraulically actuated and would be independently mounted and activated to sever the cross seal after it is formed by the head seal to separate a bottom bag from the next adjacent top bag just above it.

Alternatively, as shown in FIGS. 1 and 2 in association with the head seal bars 32 and 34 are slots collectively identified by the numeral 36. An appropriate knife blade cutter (not separately shown or numbered and also as known and available on commercial machines) can be fixedly mounted in one or the other of the slots 36 for severing the cross seal in conjunction with movement of the head seal bars 32 and 34.

In FIG. 1, as the machine 10 continually operates, appropriate filled pouches 38 are one after the other formed, filled, sealed and cut from the descending film stream formed by films 16 and 18. The pouches 38 would be fed off of the front of the machine 10 to an appropriate supply hopper or the like associated with the machine 10.

The above basic operation is true whether or not the machine 10 is making a plurality of side by side very small pouches as, for instances, one and one half inch condiment pouches or whether it is making larger pouches. Generally however, as the volume of the pouch gets larger and/or as its liquid content gets greater, during filling of the pouches the volume and/or weight of the liquid components tend to cause the front and rear films 16 and 18 to separate from one another near the top of the fill level of the pouch causing the pouch to assume somewhat of a tear drop shape. This has limited the usefulness of bagging machines with respect to large volume pouches.

For the purposes of the remainder of this specification, a bag or pouch will have been formed such that it includes continuous left and right side seals. A movable head seal having a movable front and rear seal bar will then have been utilized to form a cross seal between the side seals.

Figure 3:
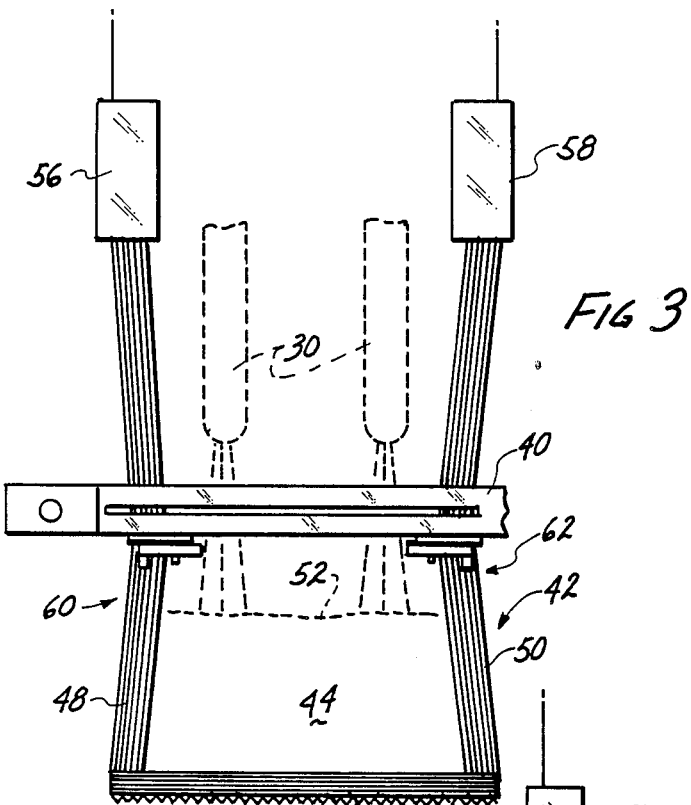
FIG. 3 is a front elevational view of a partially formed and filled bag or pouch which is being formed, filled and sealed on the representational machine of FIGS. 1 and 2.

FIG. 3 shows such a pouch, as for instance a large pouch in a one quarter pound or greater size. In FIG. 3 the filling of a pouch 42 has just been completed but the top seal, to be made in part by a front head seal bar 40 in the forground in front of pouch 42, has not as yet been made. As filled, the pouch 42 contains a volume of a liquid 44. At his point in the machine cycle, a bottom seal 46 and the side seals 48 and 50 of the pouch 42 have been formed and are stable and retain the liquid contents 44 within the pouch 42; however, since the top seal has not yet to be formed, especially near the center of the pouch 42 along the top level 52 of the liquid 44, the pouch buckles under the weight of the liquid 44 and the pouch 42 tends to balloon out in a tear drop shape. This brings the side seals 48 and 50 in toward one another.

If this pouch was not sealed by forming a top seal on it, it is possible that either or both of the front and back films 16 and 18 could be wrinkled or crimped by the sealing head and thus form a poor seal with the opposite film. When the pouch is then severed from the ascending film stream, the pouch could then leak because of an incomplete seal at the point where the material wrinkled or crumpled.

Because of this phenomenon, typically in prior form, fill and seal bagging machines, when pouches of a size capable of holding approximately one quarter pound or more liquid were attempted, a lot of leaking and therefore reject or unacceptable pouches were formed. Further, in attempting to package certain components such as cooking oils and the like wherein the pouch contents were 100% liquid in nature, high levels of rejection were also experienced even at smaller volume capacities. Wrinkles from other sources can also cause rejection of even very small pouches such as 1.5 oz pouches.

Utilizing the bag grippers of this invention, bags or pouches can be formed which are capable of holding liquid contents of various sizes from small to large. Indeed, bags or pouches can be formed which are of a width dictated only by the width of the film material utilized in the bagging machine and can be of a length which would be dictated solely by the volume of the bag or pouch sought. For instance, pouches of any length can be formed because when the final top seal is formed on any particular pouch utilizing the bag grippers of the invention the front and rear films are pulled taught and are biased toward one another such that when contacted by the head seal, no crimping or pinching of the film occurs and a perfect seal is formed. As a result of this irrespective of its size, the bag or pouch does not leak.

Figure 5:
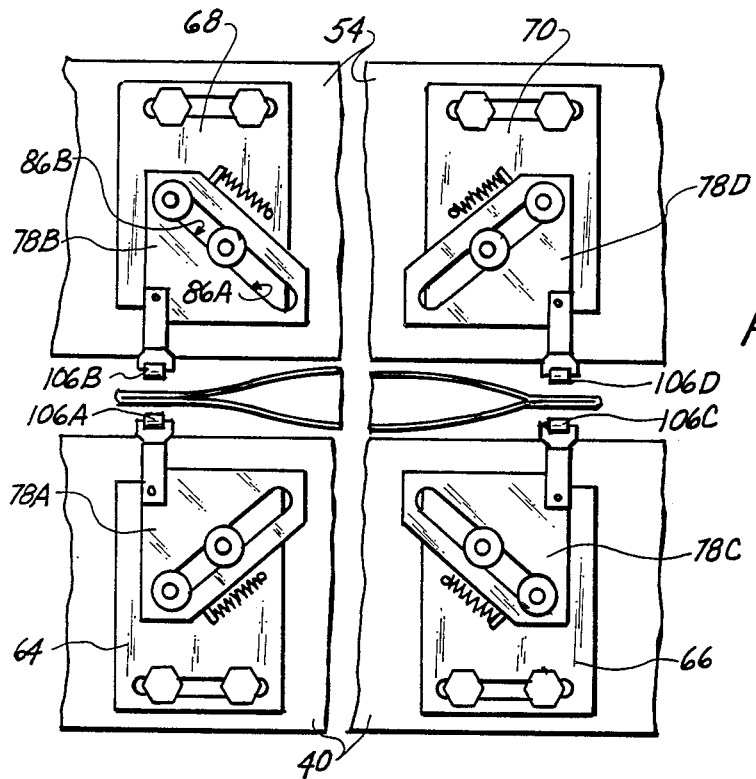
FIG. 5 is a bottom plan view about the line 5—5 of FIG. 3.

As seen in FIG. 3, after forming and filling the pouch 42 on a typical bagging machine, as for instance, the bagging machine 10, the pouch 42 is positioned behind the front head seal bar 40. Referring now to FIG. 5, located in association with the front head seal bar 40 is a rear head seal bar 54. As can be seen in FIG. 5 the pouch 42, located between the front and rear head seal bars 40 and 54, is bulged or ballooned near its center. It is conceivable that when head seal bars 40 and 54 come together to form a cross seal between the front sealing film 16 and the rear sealing film 18, the films could buckle or pinch and an area susceptible to leakage could form.

Further as is seen in FIG. 3, as the film material joined along the side seals 48 and 50 descends downwardly from side seal bars 56 and 58 which form the side seals 48 and 50, the weight of the liquid contents 44 within the pouch 42 distort the film pulling the left side edge 60 and the right side edge 62 of the film towards each other.

Figure 4:
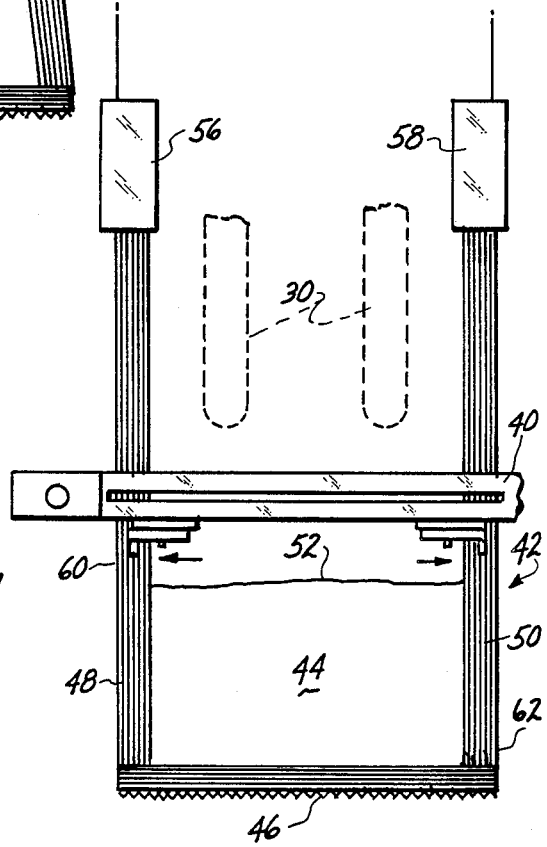
FIG. 4 is a further elevational view of the bag or pouch of FIG. 3 after the side seals of the bag or pouch have been gripped and spread apart from one another as per the teachings of this invention and just prior to the formation of a cross seal on the bag or pouch.
Figure 6:
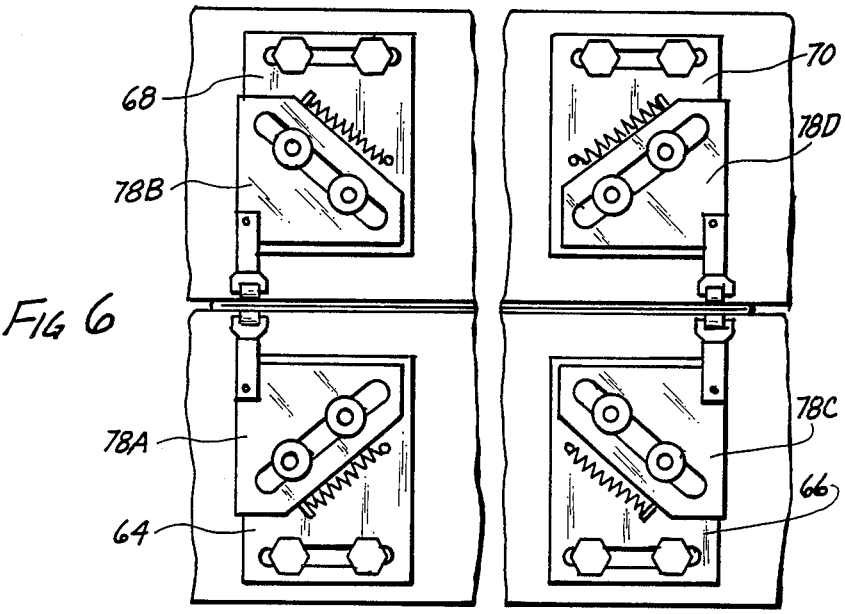
FIG. 6 is a bottom plan view about the line 6—6 of FIG. 4.

By attaching a left side front bag gripper 64 and a right side front bag gripper 66 to the left and right sides respectively of the front head seal bar 40 and a left rear bag gripper 68 and a right rear bag gripper 70 to the left and right sides respectively of the rear head seal bar 54, during operation of the head seal bars 40 and 54 the respective bag grippers 64 and 68 grip the left side seal 48 of the bag 42 and the respective bag grippers 66 and 70 grip the right side seal 50 of the bag 42 spreading the sides edges 60 and 62 of the bag 42 apart from one another. As a result of this, as seen in FIGS. 4 and 6, just prior to contact of the film by the head seals bars 40 and 54 the bag is stretched or moved such that no wrinkles, folds, crimps or the like are formed between the front and rear films during the forming of the cross seal between the films.

This then eliminates leakage between the front and rear films along the cross seal whether it be in the bottom seal in the top bag or the top seal of the next bottom bag. This provides for the forming, filling and sealing on standard bagging machines of any size bag or pouch especially larger volume bags.

Together the left front bag gripper 64 and the left rear bag gripper 68 form a first left engaging means for engaging the left side of a bag which is being formed and sealed. Further, together the right front bag gripper 66 and the right rear bag gripper 70 form a right side bag engaging means for engaging the right side of the same bag. These bag engaging means are activated by a moving component on the bagging machine as, for instance, the head seal which forms a moving means or movement means for activation of the left and right side engaging means. The head seals or other component on the bagging machine in turn would be moved by appropriate prime movers, normally air cylinders, on the bagging machine which are not shown or illustrated for brevity purposes of this specification. These prime movers would be standard as per existing commerical form, fill and seal bagging machines such as those described above.

Alternatively to attaching the left and right engaging means of the invention to a head seal they could also be attached to some other component which moves or they could be attached to independent components which would be separately driven by a prime mover under the control 14 of the bagging machine 10. However, for brevity of components and simplicity of operation of the bag grippers of the invention, typically they would be mounted to the head seal, as for instance on the bottom of the head seal so as to be moved in conjunction with the movement of the head seal. Alternately they could be mounted on the top of the head seal.

If a stream of one, two, three or even up to a dozen or more parallel bags are being made side by side on a bagging machine, sets of side by side bag grippers would be provided for each bag stream as per the representational bag grippers shown in FIGS. 1 and 2 collectively identified by the numeral 71.

The left front bag gripper 64 and the left rear bag gripper 68 form mirror image components one another. The same is true of the right front bag gripper 66 and the right rear bag gripper 70. As is evident from FIGS. 5 and 6 a particular component which is serving as the left rear bag gripper 68 is the same as the component serving as the right front bag gripper 66. The same is true with respect to the right rear bag gripper 70 which is the same as the left front bag gripper 64. This can be easily seen by rotating these pairs 180° as seen in FIGS. 5 and 6. Thus, while two independent pairs are utilized, one for the left side and one for the right side, only two mirror image components need to be manufactured; one component serving as a front component on one side and a rear component on the other side and the other component serving the opposite roles.

Figure 7:
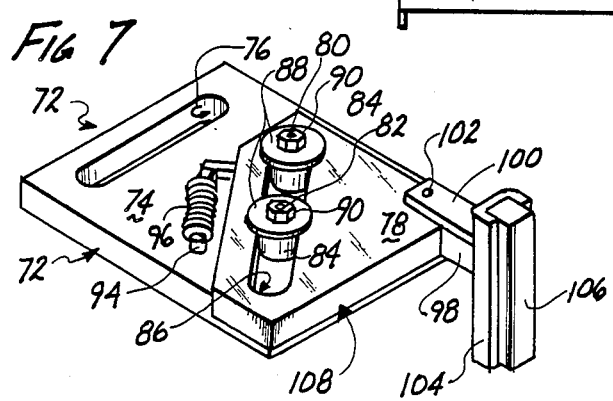
FIG. 7 is an isometric view of a single component which when utilized in conjunction with a mirror image component forms one of a left hand or right hand bag gripper of the invention.

FIG. 7 shows the construction of a typical bag engaging component. This is the component utilized as the left front gripper 64 and the right rear gripper 70. The other two grippers 66 and 68 would simply be mirror images of the component seen in FIG. 7. The bag gripper component 72 of FIG. 7 has a base 74 which includes an elongated slot 76 which is utilized to attach the base 74 to a head seal as for instance the front head seal bar 40 or the rear head seal bar 54. The slot 76 allows for minor adjustments laterally side to side of the base 74 on one or the other of the appropriate head seal bars.

A translocation member 78 fits flush against the base member 74 and slides on the base member 74. Two axles 80 and 82 thread into the base member 74 and therefore move in conjunction with it. Bosses collectively identified by the numeral 84 fit over the axles 80 and 82 and serve as bearings on the axles. The translocation member 78 includes an elongated slot 86 which is slightly oversize with respect to the bosses 84 such that the translocation member 78 can slide along the surface of the base member 74 against the bosses 84 as they rotate on the axles 80 and 82. Appropriate washers collectively identified by the numeral 88 which are oversized with respect to the slot 86 are retained on the axles 80 and 82 via nuts collectively identified by the numeral 90. This retains the translocation member 78 in sliding association with the base member 74.

A post 92 is fixed to the base member 74 and a further post 94 is fixed to the translocation member 78. A tension spring 96 extends between the posts 92 and 94. The spring 96 essentially biases the transportation member 78 as viewed in FIG. 7 such that it moves upwardly on the base member 74 toward the top of the figure.

An extension 98 projects from the front of the translocation member 78. A contacting arm 100 is supported by the extension 98 and is fastened via bolt 102 to the translocation member 78. The contact arm 100 includes an elongated extension 104 on which a contact or engagement pad 106 is attached.

The pad 106 can be formed of appropriate rubber material such that when opposing pads 106 between a front and a rear bag grippers contact opposite sides of the bag along a side seal, the film material is squeezed between the pad 106, allowing for gripping of this film material by respective bag grippers. Alternately to utilizing pads 106 which are formed of rubber material, other pads, not separately numbered or shown, could be utilized which include knurled or serrated surfaces which physically puncture or distort the film to grip the film.

The selection of the pads is dependent upon the product which will be loaded within the bag or pouch, the filled weight of the bag and the physical appearance of the bag or pouch. For certain components such as large pouches of commerical cooking oil or the like the institutional consumer would not object to serration or knurled marks on the packaging. A knurled or serrated pad would serve to better grip and hold such heavy pouches during formation of the cross seal. As such, for a large pouch directed to a commerical consumer, a more positive gripping serration or knurled pad may be utilized. However, for smaller supermarket packages or the like the individual consumer might object to marking on the pouches. Thus, in this instance since the pouches would be smaller and lighter, a non-marring rubber pad might be utilized for the supermarket consumer.

In FIG. 7 if pressure is applied to the pad 106 along a line directed at an angle approximately 45° from the lower right hand of the figure to the upper left hand of the figure along the elongated axis of the arm 100, this force is transmitted to the translocation member 78. The slot 86 which is used to mount the translocation member 78 to the base 74 would be at an angle to such a force. Because the slot 86 is at an angle to this line of force, the translocation member 78 cannot move directly back on the surface of the base member 74 along this line but it can move along a vector to this line which essentially lies along the elongated axis of the slot 86. Thus, as pressure is applied to the pad 106 the translocation member will concurrently move on the base 74 backwards towards the left hand margin of FIG. 7 and toward to the top margin of the figure. This stretches or biases the tension spring 96. When pressure is relieved from the pad 106 the bias within the spring 96 will return the translocation member 78 to it resting position, the position as seen in FIG. 7.

Referring now to FIGS. 5 and 6, FIG. 5 shows a position within the cycle of the forming, filling and sealing of a bag after completion of the side seals 48 and 50 of the bag 42 and after loading of the liquid 44 within the bag 42. As noted above, this causes the bag 42 to bulge out or balloon at its center. After the filling cycle, a typical bagging machine such as the bagging machine 10 then goes into a seal cycle where a cross seal is formed. During this cycle the front head seal bar 40 and the rear head seal bar 54 are brought toward one another. When this happens because the respective base members 74 of the respective bag grippers 64, 66, 68 and 70 are attached to the head seal bars 40 and 54 they too move in conjunction with the head seal. This movement is transferred to the respective translocation members movably attached to the base member 74.

As the opposing translocation members moved towards one another, this moves and positions the pads 106 on contacting arms 100 against the respective side seals 48 and 50 of the bag 42. When the pads contact the opposing surfaces of the film forming the side seals 48 and 50, the side seals are squeezed between the pads 106. Further forward movement of the pads 106 is now halted. Since the pads 106 are attached to the contacting arms 100 and they in turn are attached to the translocation members, further unhibited forward movement of the translocation members in concert with the base members 78 is stopped. Continuous movement of the head seal bars 40 and 54, however, is still propagated to the base members 74.

Since the translocation members 78 are now inhibited from moving in concert with the base members 74 in a straight foward direction any further movement of the head seal bars 40 and 54 and thus the base members 78 directly toward one another cause the translocation member 78 to slide along their slots 86 and in doing so, these tense their respective tension springs 96.

As seen in moving between FIGS. 5 and 6, the translocation member 78A on left front gripper 64 is caused to move to the left as the head seal bar 40 continues to approach the head seal bar 54. Concurrently the translocation member 78B on the left rear gripper 68 is also caused to move to the left because it is a mirror image of the gripper 64 and its slot 86B is oriented opposite or as a mirror image to the slot 86A of the gripper 64.

The left side seal 48 of the pouch 42 is squeezed between the pads 106A and 106B and is pulled and moved to the left as the translocation members 78A and 78B move to the left. In a like member the translocation members 78C and 78D on grippers 66 and 70 on the right hand side in moving between FIGS. 5 and 6 move to the right pulling the right edge 62 of the pouch 42 to the right. Thus, the two opposite edges of the pouch 42, the left edge 60 and the right edge 62 are moved outwardly and away from one another pulling the distorted top of the pouch 42 outwardly. This outward movement continues until just prior to the actual squeezing of the film by the head seal bars 40 and 54 as they contact against one another. At this point, as seen in FIG. 6 as the cross seal is being formed in the top of the pouch 42, the front and back films have been pulled flat such that the front and rear films are biased against one another in a smooth configuration. This eliminates and prevents any wrinkles or pinches either in the front or rear film which would be incorporated in the cross seal.

The respective left and right side edges 60 and 62 of the pouch 42 are moved in opposite directions along an elongated pathway which essentially traverses between the head seal bars 40 and 54. To achieve this movement, the translocation members 78 have moved along a vector which at an angle to the direction of motion of the head seal bars 40 and 54. As is shown in the illustrated embodiments of the invention herein, this vector is approximately 45° as determined by the orientation of the slots 86. It is evident that other angles could be chosen. By decreasing the angle between the slot 86 and the front 108 of the translocation member 78 a more pronounced outwardly movement of each of the contacting arms 100 would be achieved and by increasing this angle the amount of movement of the contacting arms 100 would be lessened.

It is further evident that if the angle between the slot 86 on the translocation members on one of the sides as, for instance the right side, that is the translocation members 78C and 78D, was made 90° to the front edge 108 of these respective translocation members, there, in fact, would be no lateral movement of the contacting arm 100 in response to forward movement of the bases 66C and 66D. However, the right edge 62 of the film would still be trapped and held stationary. As such pulling still could occur across the top of the bag 44 by movement of the left bag grippers 64 and 68.

Thus only one of the left or the right bag engagement means, i.e. one of the sets of bag grippers 64 and 68 or 66 and 70, need actually move transverse to the movement of the head seals 26 and 54 for pulling or stretching of the top of the bag or pouch to occur. However, by splitting the total transverse movement into two opposing component movements, one to the left and one to the right, each side of the bag 42 only has to move a portion of the distance to assure correct positioning of the front and back films in a smooth continuous line in between the head seal bars 40 and 54.

As is evident from the shape of the side edges 60 and 62 of the film in FIG. 3 which forms the pouch 42, the bag grippers could be placed on the top of the head seals and still properly function. However, by placing them on the bottom of the head seal they are located closer or in a more direct in line with the fill line or top level 52 of the liquid within the bag or pouch 42.

After the top of the bag 42 has been stretched by moving its respective side edges 60 and 62 outwardly from one another and an appropriate cross seal formed by the head seal bars 40 and 54 coming together and heat sealing the film, when the head seal bars 40 and 54 withdraw from one another, the bias induced in the tension springs 96 returns the translocation members 78 from their position seen in FIG. 6 to the position seen in FIG. 5 such that they release from the bag 42 and are now in position to engage the next bag as it is formed on the bagging machine.

Each time that the head seal bars 40 and 54 come together the respective bag grippers 64, 66, 68 and 70 engage the left and right side edges of the bag, spread these side edges apart, hold them in this configuration during forming a cross seal and then release from the bag when the head seal bars 40 and 54 are moved apart from one another preparing for the next bag in the cycle.

The bag grippers of the invention allow for packaging of oils such as vegetable oils, motor oils and the like in large volumes heretofore unachievable on continuous form, fill and seal bagging machines. Further, large size pouches or bags suitable for commercial or industrial use are also achievable.

The bag gripper of the invention assist in removing wrinkles and the like from other sources as for instance pinches or folds in the films from the side seals, feed rollers or the like. Thus they are useful for all sizes of bags even very small pouches.

While typically the lowermost filled bag will be severed from the top empty bag immediately after formation of the cross seal, it is not necessary to separate the bags at this time. Alternately a continuous stream of connected bags can be formed.

During the process of the invention utilizing the bag grippers of the invention, after each of the bags is filled and its top seal is formed during formation of the cross seal, the bag grippers of the invention assure that each component bag or pouch in this continuous chain is formed with an integral seal and does not leak. As such even in a long chain of bags there will not be any defective bags. Thus if desired for shipping or other purposes, long chains of bags can be formed.

In the process of a form, fill and seal bagging machine, by incorporating a gripping cycle wherein the left and right side edges of a bag are gripped at a point in association with a fill level and spread apart from one another to bias the front and back films toward one another along a line which is essentially parallel to and slightly placed above the fill level, an integral seal can be consistently formed in each bag produced during large production runs.

I claim:

1. A bag gripper for a form, fill and seal bagging machine which comprises:
   a left side bag engaging means for engaging the left side of a bag being formed, filled and sealed on said bagging machine, said left side bag engaging means located on said bagging machine in a position to engage the left side of said bag;
   a right side bag engaging means for engaging the right side of a bag being formed, filled and sealed on said bagging machine, said right side bag engaging means located on said bagging machine in a position to engage the right side of said bag;
   movement means for moving at least a portion of each of said left and said right side bag engaging means in a direction away from the other of said left or right side bag engaging means, said movement of said bag engaging means transferring to said left and said right sides of said bag to move said sides of said bag outwardly away from each other;
   said bagging machine of the type including a head seal, said head seal of the type including first and second members at least one of which is movable with respect to the other towards and away from the other; and
   said left side engaging means and said right side engaging means each located on said head seal to move in conjunction with said head seal in response to said movement of said head seal;
   said left engaging means includes a front engagement component and a rear engagement component;
   said right engaging means includes a front engagement component and a rear engagement component; and
   each of said left front, said left rear, said right front and said right rear engagement components include a base member and a sliding member and means for slidably connecting said respective sliding members to said respective base members such that said respective sliding members slide on said respective base members along vectors which are at an angle to the direction of movement of said head seal.

2. A bag gripper for a form, fill and seal bagging machine which comprises:
   a left side bag engaging means for engaging the left side of a bag being formed, filled and sealed on said bagging machine, said left side bag engaging means located on said bagging machine in a position to engage the left side of said bag;
   a right side bag engaging means for engaging the right side of a bag being formed, filled and sealed on said bagging machine, said right side bag engaging means located on said bagging machine in a position to engage the right side of said bag;
   movement means for moving at least a portion of each of said left and said right side bag engaging means in a direction away from the other of said left or right side bag engaging means, said movement of said bag engaging means transferring to said left and said right sides of said bag to move said sides of said bag outwardly away from each other;
   each of said left and said right side engaging means including a base means for attaching to and moving in conjunction with movement of a component part of said bagging machine;
   each of said engaging means further including a translocation means positioned on said base means for moving on said base means, said translocation means moving on said base means in response to movement of said base means;
   said respective engaging means each further including a redirection means for moving their respective translocation means along a vector which is at an angle to a direction of movement of said base means in response to movement of said base means;
   each of said respective translocation means includes a bag contacting means for contacting and gripping a respective side seal of said bag;
   said bagging machine of the type including a head seal, said head seal of the type including first and second members at least one of which is movable with respect to the other towards and away from the other;
   said base means on said left side engaging means and said base means on said right side engaging means each located on a head seal to move in conjunction with said head seal in response to said movement of said head seal
   said left engaging means includes a front engagement component and a rear engagement component;
   said right engaging means includes a front engagement component and a rear engagement component; and
   each of said left front, said left rear, said right front and said right rear engagement components include a base member and a sliding member and means for slidably connecting said respective sliding members to said respective base members such that said respective sliding members slide on said respective base members along vectors which are at an angle to the direction of movement of said head seal.

3. In combination with a form, fill and seal bagging machine which utilizes a movable head seal to form a seal between first and second heat sealable films to form bottom and top seals on adjacent bags an improvement which comprises:
   a left side bag engaging means for engaging the left side of a bag on said bagging machine, said left side bag engaging means located on said machine in operative association with both said head seal and the left side of said bag;
   a right side bag engaging means for engaging the right side of a bag on said bagging machine, said right side bag engaging means located on said machine in operative association with both said head seal and the right side of said bag; and
   one but not both of said left or right side bag engaging means movable in a direction away from the other of said left or right side bag engaging means in response to movement of said head seal, said movement of said bag engaging means transferring to one of said left or right sides of said bag to move said one side of said bag outwardly away from the other side of said bag.

4. A bag gripper for a form, fill and seal bagging machine which comprises:
- a left side bag engaging means for engaging the left side of a bag being formed, filled and sealed on said bagging machine, said left side bag engaging means located on said bagging machine in a position to engage the left side of said bag;
- a right side bag engaging means for engaging the right side of a bag being formed, filled and sealed on said bagging machine, said right side bag engaging means located on said bagging machine in a position to engage the right side of said bag;
- movement means for moving at least a portion of each of said left and said right side bag engaging means in a direction away from the other of said left or right side bag engaging means, said movement of said bag engaging means transferring to said left and said right sides of said bag to move said sides of said bag outwardly away from each other;
- said bagging machine of the type including a head seal, said head seal of the type including first and second members at least one of which is movable with respect to the other towards and away from the other;
- said left engaging means includes a front engagement component and a rear engagement component;
- said right engaging means includes a front engagement component and a rear engagement component;
- each of said left front, said left rear, said right front and said right rear engagement components including a base member and a translocation member;
- said base members each including an upstandng boss; and
- said translocation members each including an elongated slot formed in said translocation member, said slots sized and shaped to fit over said bosses whereby a respective translocation member is capable of sliding on its respective base member.

5. The bag gripper of claim 4 wherein:
said slots on said respective translocation member of both said left bag engaging means and said right side bag engaging means are oriented at an angle with respect to the direction of movement of said first and said second members of said head seals.

6. The bag engagement means of claim 4 wherein:
said elongated slots on the translocation members of one of said left side bag engaging means or said right side bag engaging means is located at an angle with respect to the direction of movement of said first and second members of said head seal and the elongated slots on the translocation members of the other of said left side bag engaging means and said right side bag engaging means is located along the line of movement of said first and said second members of said head seal.

* * * * *

UNITED STATES PATENT AND TRADEMARK OFFICE
CERTIFICATE OF CORRECTION

PATENT NO. : 4,768,330
DATED : SEPTEMBER 6, 1988
INVENTOR(S) : WILLIAM A. LANE, JR.

It is certified that error appears in the above-identified patent and that said Letters Patent is hereby corrected as shown below:

Column 1, line 25, "other wise" should be --otherwise--.
Column 2, line 40, "to an" should be --to a--.
Column 2, line 50, "materails" should be --materials--.
Column 2, line 61, "sufaces" should be --surfaces--.
Column 3, line 24, "is operative" should be --in operative--.
Column 5, line 49, "26B and 26" should be --26B and 26C--.
Column 6, line 40, "them" should be --then--.
Column 7, line 29, "his" should be --this--.
Column 7, line 33, "to be" should be --been--.
Column 9, line 18, "components one" should be --components of one--.
Column 11, line 1, "moved" should be --moves--.
Column 11, line 10, "unhibited" s
Column 11, line 3
Column 11, line 5

Signed and Sealed this

Thirtieth Day of April, 1991

Attest:

HARRY F. MANBECK, JR.

Attesting Officer        Commissioner of Patents and Trademarks